Figure 1:
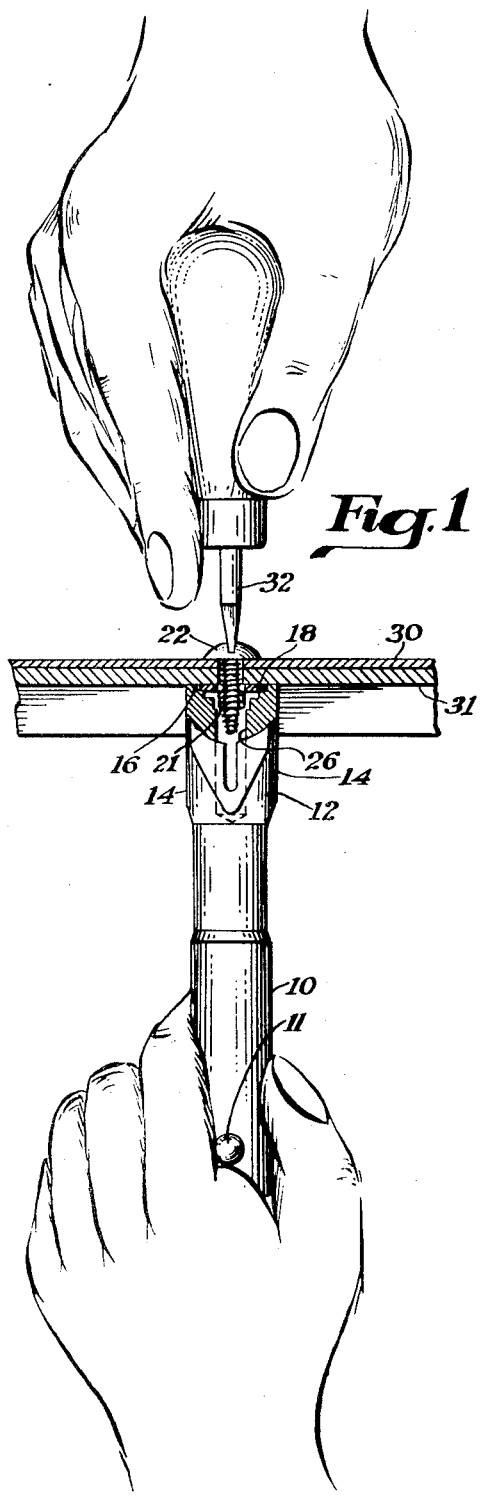

Oct. 24, 1950     E. S. SNYDER ET AL     2,527,157
TOOL FOR APPLYING SHEET METAL
NUTS TO SCREWS OR STUBS

Filed Nov. 8, 1945     2 Sheets-Sheet 1

INVENTORS.
EVERETT S. SNYDER.
AND ROLLY A. JOHNSON.
BY
*Bates, Teare & McBean*
*attorneys.*

Oct. 24, 1950
E. S. SNYDER ET AL
TOOL FOR APPLYING SHEET METAL
NUTS TO SCREWS OR STUBS
2,527,157
Filed Nov. 8, 1945
2 Sheets-Sheet 2
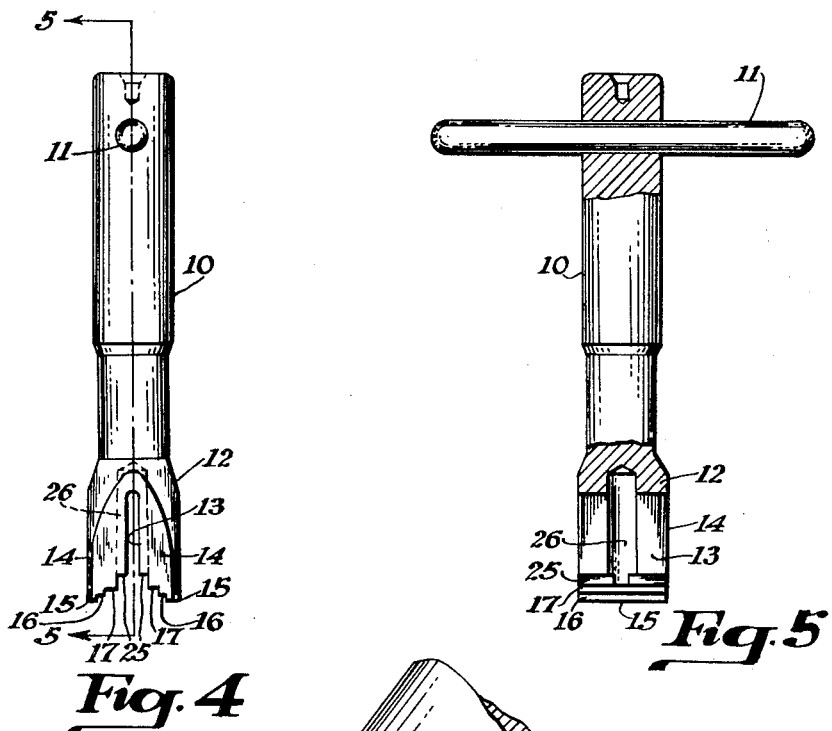
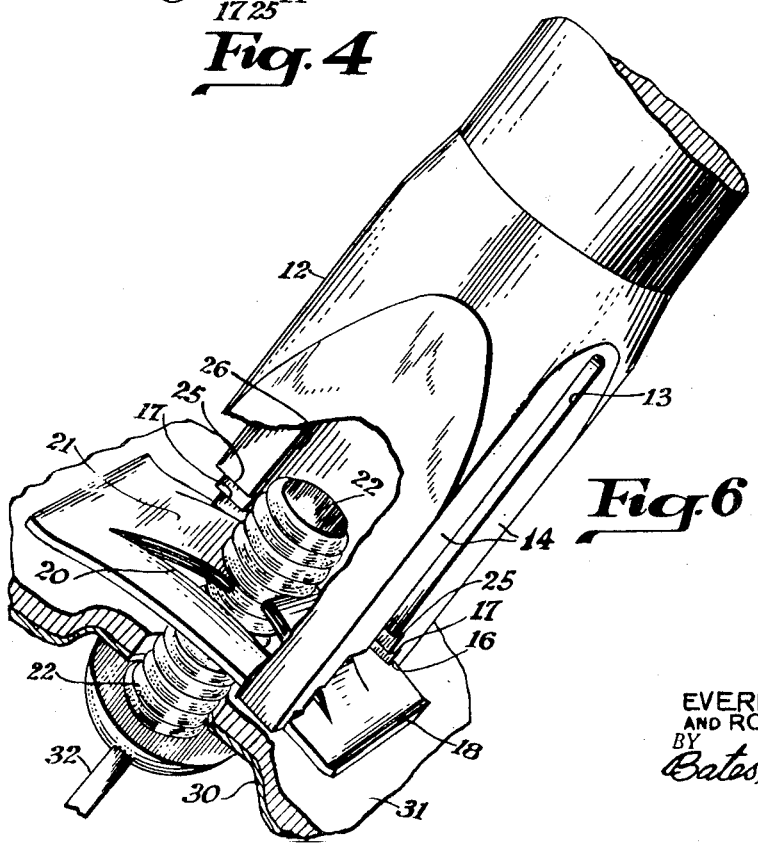
INVENTORS.
EVERETT S. SNYDER
AND ROLLY A. JOHNSON.
BY
Bates, Teare McBean
Attorneys.

Patented Oct. 24, 1950

2,527,157

UNITED STATES PATENT OFFICE 2,527,157

TOOL FOR APPLYING SHEET METAL NUTS TO SCREWS OR STUDS

Everett S. Snyder, Van Nuys, and Rolly A. Johnson, Los Angeles, Calif., assignors to Tinnerman Products, Inc., Cleveland, Ohio, a corporation of Ohio Application November 8, 1945, Serial No. 627,318

1 Claim. (Cl. 81—3)

This invention relates to tools, and particularly to a tool for use with sheet metal nuts in applying the same to locked fastening engagement on a threaded screw or stud.

The type of nut for which the tool of this invention is adapted comprises a sheet metal body, provided with an aperture, and spring fingers struck from the body for engagement with the thread of a screw or stud passing through the aperture, the body itself being bowed in the direction of the fingers. In the rapid fastening of two articles together, such a nut may be thrust axially along a screw, the spring fingers snapping across the crests of the thread, until the nut contacts the article which it is to clamp. Further pressure on the body flattens it out and places it in a tensioned condition. A relative turning movement of the nut and the threaded member is then effected, which causes the ends of the spring fingers to travel along the screw thread towards the article, placing the fingers in compression. Thereafter, the spring fingers perform as struts to maintain the body in its flattened, stressed position. As the body attempts to assume its normal untensioned condition, the tongues are caused to move toward each other and become imbedded in the shank of the screw in locked relation thereto.

The type of nut described lends itself well to rapid assembly and, to take full advantage of it, is is highly desirable to have a tool with which it may be applied with a minimum of time and effort on the part of the operator. The tool should be adaptable to various sizes of nuts. It should be able to retain and transport a nut to the work, to thrust the nut axially upon the screw, and finally to turn the nut to locking engagement.

The object of the present invention is to provide a tool adapted to perform the above functions in an expeditious manner.

The tool of our invention, an embodiment of which we have shown in the accompanying drawings, has a handle, which may be conveniently grasped by the operator, and a head adapted to engage the nut. The head is bifurcated and magnetized and performs as a horseshoe magnet to retain the sheet steel nut. The free ends of the two head members or magnet legs are provided with a plurality of steps to accommodate the edges of the bodies of various sized nuts, and a longitudinal bore is provided to clear the threaded member upon which the nut is to be thrust. The tool is simple in form and manufacture and, by its use, much time and effort may be saved in assemblies utilizing sheet steel nuts.

Figure 2:
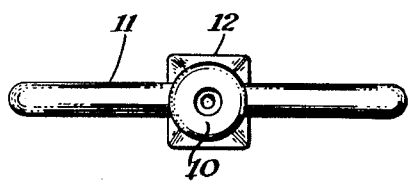
Figure 3:
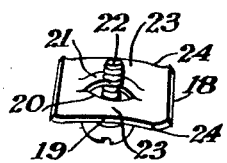

In the drawings, Fig. 1 is an elevational view, partly in section, of the tool in use; Fig. 2 is a plan view of the tool itself; Fig. 3 is a perspective view of a sheet metal nut, with which the tool may be used, and a screw to coact therewith; Fig. 4 is a side elevation of the tool; Fig. 5 is a longitudinal section taken on the line 5—5 of Fig. 4; and Fig. 6 is a perspective view of the tool, nut, screw and articles to be joined, partly broken away to illustrate their interrelationship.

The device of our invention may conveniently take the form of a tool as shown in the drawings, wherein a T-shaped handle comprising a shank 10 and a cross member 11 is provided with a head 12. One of the functions of the tool is the retention of the nut thereon for convenient transfer to the work and, to this end, the head is bifurcated, as at 13, for substantially its entire length and is permanently magnetized. The two head members 14, or legs of the magnet, are joined at their upper ends, as shown in the drawing, and provide a path for the flux. The gap across their free ends 15 is bridged by the nut when the tool is in operation, and the nut is effectively retained as an armature across the magnet.

The tool is designed to accommodate nuts of varying widths. To this end, shallow recesses are provided by pairs of steps or shoulders 15—15 and 16—16 in the ends of the head elements 14, the depth of the individual recesses being substantially the same as the thickness of the nuts to be accommodated. The type of nut with which the present tool is adapted to be used is illustrated, in Fig. 3, at 18. The rectangular spring steel body is bowed upwardly intermediate its length at 19 and is provided with an aperture 20 and spring fingers 21 struck upwardly adjacent the aperture. The ends of the fingers are adapted to engage the screw threads of a member such as the screw 22. The tool is designed to engage the face surface of the intermediate regions 23 of the nut, and to engage the side edges 24 to prevent its rotation, or to rotate it, as the case may be. The tool is provided with a central recess, at 25, of sufficient width and depth to clear the spring fingers 21 to avoid possible mutilation thereof, and a longitudinal bore is provided at 26 to clear the end of the threaded member as the nut is thrust upon it.

In the operation of securing articles together, such as the sheets 30 and 31 in Figs. 1 and 6, the screw 22 is inserted through appropriate apertures in the articles and the screw head is held in firm engagement with the article surface, as by the screwdriver 32 in the hand of the operator. A nut is then picked up with the magnet and properly oriented to engage the appropriate recess seat. A simple axial thrust then slides the nut over the screw, the spring fingers snapping over the screw thread crests in the meanwhile, until the end of the tool engages the article. The tool is held in this position and the screw is given a turn or two by means of the screwdriver to bring the spring fingers to locking engagement, the shoulders of the tool head preventing rotation of the nut in the meanwhile. Alternatively, the screw threaded member may be a stud securely mounted on one of the articles, and the tool may be used to rotate the nut after it has positioned it on the screw.

Instead of the horseshoe magnet configuration illustrated, a bar magnet form may be used in which the bifurcation at 13 is omitted and the nut engaging end of the head becomes one of the poles of the magnet.

Thus, while we have shown and described a specific embodment, it will be apparent that numerous modifications may be made within the spirit and scope of our invention.

We claim:

A tool for applying a sheet metal nut having projecting thread-engaging means to a screw, said tool having a head with a plurality of successively narrower recesses therein, said recesses having their opposite sides parallel with each other and the bottoms of the recesses being parallel with the end of the head and all open at such end and at the opposite sides of the head, there being a further recess beyond the narrowest of those mentioned to clear the thread-engaging means, and an axial bore beyond said further recess to receive the projecting portion of the screw.

EVERETT S. SNYDER.
ROLLY A. JOHNSON.

REFERENCES CITED

The following references are of record in the file of this patent:

UNITED STATES PATENTS

| Number | Name | Date |
|---|---|---|
| 445,451 | Miller | Jan. 7, 1891 |
| 563,848 | Dunham | July 14, 1896 |
| 1,867,041 | Walters | July 12, 1932 |
| 2,137,929 | Tinnerman | Nov. 22, 1938 |
| 2,177,232 | Tinnerman | Oct. 24, 1939 |
| 2,270,153 | Tinnerman | Jan. 13, 1942 |
| 2,403,718 | Hauck | July 9, 1946 |